United States Patent
Jeong (10) Patent No.: US 10,311,487 B2
(45) Date of Patent: Jun. 4, 2019

(54) SELECTING AND PRICING CONTENT ITEMS INCLUDING MULTIPLE BID AMOUNTS

(71) Applicant: Facebook, Inc., Menlo Park, CA (US)

(72) Inventor: Seungwong Jeong, Stanford, CA (US)

(73) Assignee: Facebook, Inc., Menlo Park, CA (US)

( * ) Notice: Subject to any disclaimer, the term of this patent is extended or adjusted under 35 U.S.C. 154(b) by 699 days.

(21) Appl. No.: 14/981,654

(22) Filed: Dec. 28, 2015

(65) Prior Publication Data

US 2017/0186049 A1    Jun. 29, 2017

(51) Int. Cl.
*G06Q 30/02* (2012.01)

(52) U.S. Cl.
CPC ............................... *G06Q 30/0275* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 2009/0319386 | A1* | 12/2009 | Jain ................... | G06Q 30/0601 705/26.1 |
| 2013/0124297 | A1* | 5/2013 | Hegeman ............... | G06Q 30/02 705/14.42 |
| 2014/0172587 | A1* | 6/2014 | Somech ............. | G06Q 30/0275 705/14.71 |

OTHER PUBLICATIONS

Fuzzy rule optimization for online auction frauds detection based on genetic algorithm. Yu, Cheng Hsien; Lin, Shi Jen. Electronic Commerce, 13.2: 169-182. Springer. (May 2013) (Year: 2013).*
Collusion in one-shot second-price auctions Chien-Liang, Chen; Tauman, Yair. Economic Theory 28.1: 145-172. Springer Science & Business Media. (May 2006) (Year: 2006).*
Jeong, S., "Essays on Market Design and Auction Theory," Diss. Stanford University, Dec. 2015, 100 pages.

* cited by examiner

*Primary Examiner* — David J Stoltenberg
*Assistant Examiner* — Gautam Ubale
(74) *Attorney, Agent, or Firm* — Fenwick & West LLP (57) ABSTRACT

To select content for presentation to a viewing user, an online system maintains multiple bid amounts associated with various content items. Content items are each associated with multiple bid amounts, with each bid amount specifying an amount of compensation to the online system and identifying a user, so the bid amount identifies an amount of compensation to the online system for selecting the content item in place of content items associated with the identified user. Based on users identified by bid amounts in various content items, the online system generates connections between content items and determines a group of content items including content items connected to each other content item in the group. Using connections between content items in the group, the online system selects a content item and determines a price charged to a user associated with the selected content item.

18 Claims, 4 Drawing Sheets

SELECTING AND PRICING CONTENT ITEMS INCLUDING MULTIPLE BID AMOUNTS

BACKGROUND

This disclosure relates generally to selecting content for presentation to online system users, and more specifically to determining pricing for sponsored content presented to users via an online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

When a conventional online system identifies an opportunity to present sponsored content to a user, the online system identifies various sponsored content items eligible for presentation to the user and performs one or more selection processes to select one or more sponsored content items. Many online systems use an auction as a selection process to select one or more sponsored content items based on bid amounts associated with the sponsored content items eligible for presentation to the user. A bid amount associated with a sponsored content item identifies a maximum amount of compensation a user associated with the sponsored content item is willing to provide the online system for presenting the sponsored content. In an auction performed by a conventional online system, the online system selects a sponsored content item having a maximum bid amount from the sponsored content items eligible for presentation to the user. However, auctions performed by conventional online systems do not account for a user often being willing to provide different amounts of compensation to the online system for selection of sponsored content from the user over sponsored content from different users. For example two users may be willing to compete against each other via higher bid amounts, although both users may benefit from presentation of sponsored content from another user. This may reduce the efficiency of auctions performed by conventional online systems.

SUMMARY

An online system receives advertisement requests ("ad requests") from one or more users with each ad request including an advertisement for presentation to online system users. Additionally, each ad request includes one or more bid amounts. A bid amount included in an ad request identifies an amount of compensation to the online system from a user providing the ad request in exchange for the online system presenting an advertisement from the ad request to a user or in exchange for a user performing one or more interactions with the advertisement from the ad request if the advertisement is presented to the user. Each bid amount included in an ad request also identifies an alternative user, so a bid amount specifies a maximum amount of compensation a user associated with the ad request is willing to provide the online system to select the ad request over another ad request provided to the online system by the alternative user. Hence, an ad request may include different bid amounts each associated with different alternative users. This allows a user to specify different amounts of compensation to the online system for selecting the ad request relative to other ad requests associated with different alternative users. The online system therefore maintains multiple ad requests, where each ad request includes multiple bid amounts that each identifies an alternative user and specifies an amount of compensation to the online system from a user associated with the ad request.

When the online system identifies an opportunity to present an advertisement to a viewing user, the online system determines connections between each ad request eligible for presentation to the viewing user based on the bid amounts included in the identified ad requests. A connection between an ad request and an additional ad request includes a bid amount included in the ad request that identifies a user associated with the additional ad request. Hence, a connection between the ad request and the additional ad request represents an amount of compensation a user associated with the ad request is willing to provide the online system to select the ad request over the additional ad request. Similarly, a connection between the additional ad request and the ad request represents an amount of compensation an alternative user associated with the additional ad request is willing to provide the online system to select the additional ad request over the ad request. Based on the connections between various ad requests, the online system maintains a graph of ad requests eligible for presentation to the viewing user Using the connections between ad requests, the online system selects an ad request including an advertisement for presentation to the viewing user. The online system selects an amount of compensation and removes connections between ad requests including bid amounts equaling the selected amount of compensation. After removing the connections between ad requests including bid amounts equaling the selected amount of compensation, the online system determines one or more groups of ad requests based on the connections between the identified ad requests. A group of ad requests includes multiple ad requests that are connected to each of the other ad requests in the group. A connection between ad requests in the group may be a direct connection, where an ad request is connected to another ad request in the group, or may be an indirect connection, where an ad request is connected to an intermediate ad request that is connected to the other ad request in the group or that is connected to one or more intermediate ad requests in the group, with at least one of the intermediate ad requests connected to the other ad request in the group.

If the online system determines a single group including the ad requests eligible for presentation, the online system iteratively increases the selected amount of compensation and removes connections between ad requests in the group including bid amounts equaling the increased selected amount of compensation. Ad requests that are no longer connected to at least one other ad request in the single group after removal of a connection are removed from evaluation by the online system. The online system increases the selected amount of compensation, removes connections including bid amounts equaling the increased selected amount of compensation, and removes ad requests no longer connected to at least one other ad request until a single ad request remains, which includes the advertisement selected for presentation to the viewing user.

Additionally, the online system determines a price to charge a user associated with the selected ad request based on bid amounts included in the selected ad request that were included in connections most recently removed prior to selection of the selected ad request. For example, the online system determines the price charged to the user associated with the selected ad request as a bid amount included in a connection between the selected ad request and another ad request in the group that was most recently removed. In other embodiments, the online system determines the price charged to the user associated with the selected ad request as a function of bid amounts included in connections between the selected ad request and other ad requests in the group including amounts specified by a user associated with the selected ad request that were most recently removed. For example, the online system determines the price charged to the user associated with the selected ad request as a mean or a median of the bid amounts specified by the user associated with the selected ad request included in connections between the selected ad request and the other ad requests in the group that were most recently removed prior to selecting the selected ad request. As another example, the online system determines the price charged to the user associated with the selected ad request as a maximum bid amount included in the selected ad request and included in connections between the selected ad request and the other ad requests in the group that were most recently removed prior to selecting the selected ad request. Alternatively, the online system determines the price charged to the user associated with the selected ad request as a minimum bid amount included in the selected ad request and included in connections between the selected ad request and the other ad requests in the group that were most recently removed prior to selecting the selected ad request. In other embodiments, the online system determines the price charged to the user associated with the selected ad request by randomly selecting a bid amount included in the selected ad request and included in one of the connections between the selected ad request and the other ad requests in the group that was most recently removed prior to selecting the selected ad request.

If the online system determines multiple groups of ad requests, the online system removes one or more groups in which each ad request in the group includes bid amounts identifying users associated with other ad requests in the group and does not include bid amounts identifying users associated with ad requests outside of the group. Users associated with ad requests in a group where no ad request includes a bid amount identifying a user associated with an ad request outside of the group are users only bidding against users associated with other ad requests in the group. Hence, users in a group that does not include an ad request having a bid amount identifying a user outside of the group may have an incentive to collude with each other to determine a maximum bid amount shared by multiple users associated with ad requests in the group. Additionally, a user associated with an ad request in a group that does not include an ad request having a bid amount identifying another user outside of the group may provide the online system with greater amounts of compensation than desired to prevent selection of other ad requests in the group associated with different users when selection of an ad request associated with a user outside of the group would benefit the user by preventing selection of other ad requests in the group associated with different users.

When multiple groups are determined, the online system determines connections between various remaining groups and bid amounts included in the connections between groups. A connection between a group and an additional group includes a bid amount based on bid amounts associated with ad requests in the group that identify users associated with ad requests included in the additional group. In various embodiments, the online system determines a bid amount included in a connection between a group and an additional group as a maximum bid amount included in an ad request in the group that identifies a user included in the additional group. Alternatively, the online system determines the bid amount the connection between a group and an additional group as a minimum bid amount included in an ad request in the group that identifies a user included in the additional group. In another embodiment, the online system determines the connection between a group and an additional group as a mean of bid amounts included in ad requests in the group that identify a user included in the additional group. Hence, a bid amount included in a connection between a group and an additional group specifies an amount of compensation a user associated with an ad request in the group will provide the online system so the ad request in the group is selected by the online system instead of an ad request included in the additional group.

Based on the connections between various groups, the online system removes groups until a single group of ad request remains and selects an ad request from the remaining single group, as further described above. In various embodiments, the online system removes connections between groups based on the bid amounts included in the connections between groups and removes groups that are no longer connected to other groups until a single group of ad requests remains. For example, the online system removes a connection between groups having a minimum bid amount then continues removing a connection between groups having a minimum bid amount from the remaining groups and removing groups without a connection to at least one other group after removing the connection until a single group remains. As described above, the online system determines a price to charge the user associated with the ad requests selected from the remaining single group based on bid amounts included in the selected ad request that were included in connections between the selected ad request and other ad requests removed most recently before selection of the selected ad request, as further described above.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
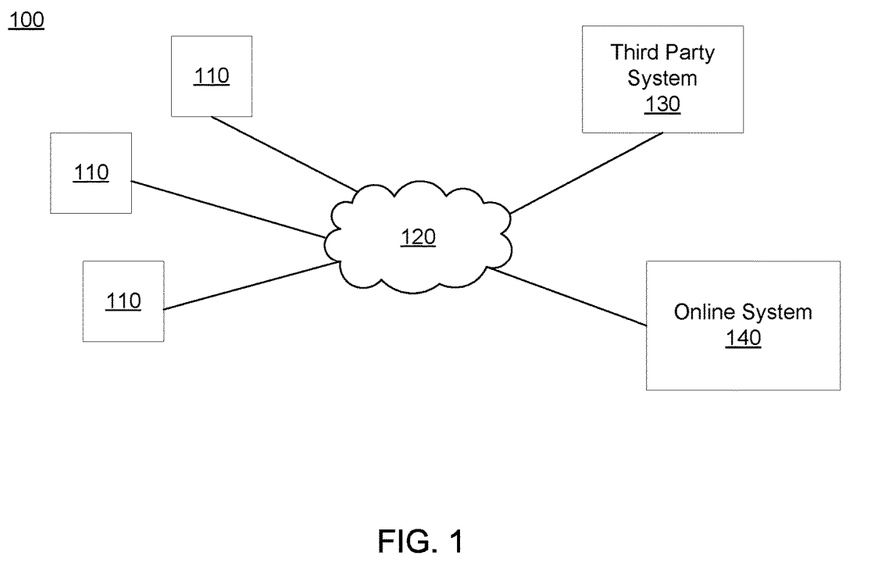
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
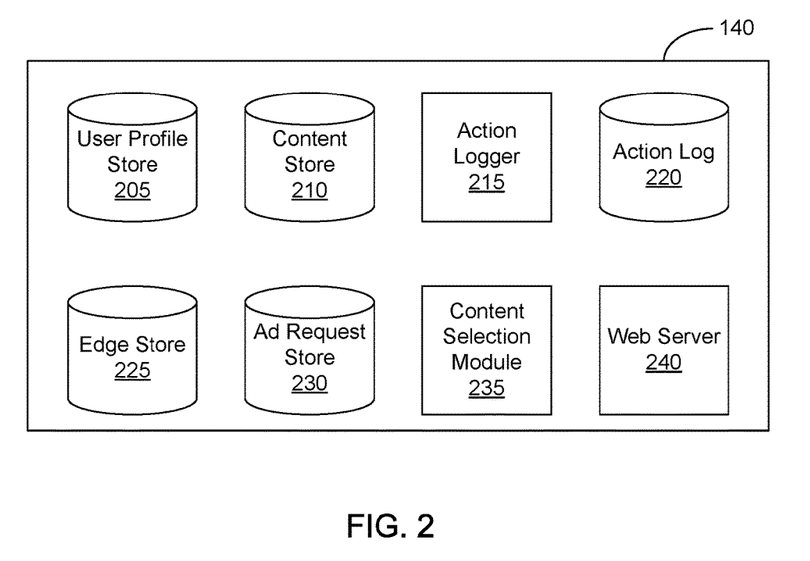
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, a location store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement" and one or more bid amounts. The advertisement content is text, image, audio, video, or any other suitable data presented to a user. In various embodiments, the advertisement content also includes a landing page specifying a network address to which a user is directed when the advertisement is accessed. Each bid amount included in an ad request is specified by a user providing the ad request to the online system 140 (i.e., an "advertiser") and specifies a maximum amount of compensation the user is willing to provide the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the user if advertisement content in an ad request is displayed. The online system 140 may determine an expected value to the online system 140 for presenting advertisement content from an ad request based on a bid amount included in the ad request. In some embodiments, the expected value to the online system 140 of presenting the advertisement content may be determined by multiplying the bid amount by a probability of the content being accessed by a user.

In various embodiments, an ad request includes multiple bid amounts that each specify an amount of compensation to the online system 140 from a user associated with the ad request and identify an alternative user. Hence, a bid amount included in an ad request specifies a maximum amount of compensation a user associated with the ad request is willing to provide the online system 140 to select the ad request over another ad request provided to the online system 140 by the alternative user. This allows a user associated with the ad request to specify different amounts of compensation to the online system 140 in exchange for selecting the ad request instead of other ad requests that are associated with different alternative users. For example, an ad request includes a high bid amount associated with an alternative user with whom the user directly competes and also includes a lower bid amounts associated with another alternative user with whom the user indirectly competes. Hence, the online system 140 maintains multiple ad requests including multiple bid amounts that each identify an alternative user and specify an amount of compensation to the online system 140 from a user associated with the ad request.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

When ad requests include multiple bid amounts each associated with different users, the content selection module 235 selects an ad request using a multidimensional auction in various embodiments. To perform the multidimensional auction, the content selection module 235 establishes connections between ad requests based on the bid amounts included in the ad requests. For example, a connection between an ad request and an additional ad request indicates the ad request includes a bid amount identifying a user associated with the additional ad request. The connection between the ad request and the additional bid request includes the bid amount included in the ad request that identifies the user associated with the additional ad request. To prevent excessive competition between certain users, which may provide users with an incentive to collude with each other, the content selection module 235 identifies a group of ad requests in which each ad request in the group has a direct connection or an indirect connection to each other ad request in the group. Based on the connections between ad requests in the group, the content selection module 235 removes ad requests from the group until a single ad request remains in the group, which the content selection module 235 selects for presentation. For example, the content selection module 235 removes connections including increasing bid amounts between ad requests in the group and removes ad requests no longer coupled to at least one other ad request after removal of the connections from the group. If multiple groups of ad requests are identified, the content selection module 235 determines connections between the groups based on bid amounts of ad requests in groups identifying users associated with ad requests in another group and removes groups based on the determined connections until a single group remains, as further described below in conjunction with FIGS. 3-5B.

The content selection module 235 also determines a price to charge a user associated with the selected ad request based on bid amounts included in the selected ad request that were also included in connections between the selected ad request and other ad requests. In various embodiments, the content selection module 235 determines the price charged to the user associated with the selected ad request as a function of bid amounts included in the selected ad request and included in connections between the selected ad request and other ad requests that were most recently removed prior to selection of the selected ad request. For example, the content selection module 235 determines the price charged to the user associated with the selected ad request as a mean or a median of the bid amounts included in the selected ad request and included in connections between the selected ad request and the other ad requests in the group that were most recently removed prior to selecting the selected ad request. In other examples, the content selection module 235 determines the price charged to the user associated with the selected ad request as a maximum bid amount or a minimum bid amount included in the selected ad request and included in connections between the selected ad request and the other ad requests in the group that were most recently removed prior to selecting the selected ad request. Determining the price charged to the user associated with the selected ad request is further described below in conjunction with FIGS. 3-5B.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Determining Pricing for an Advertisement Selected by an Online System

Figure 3:
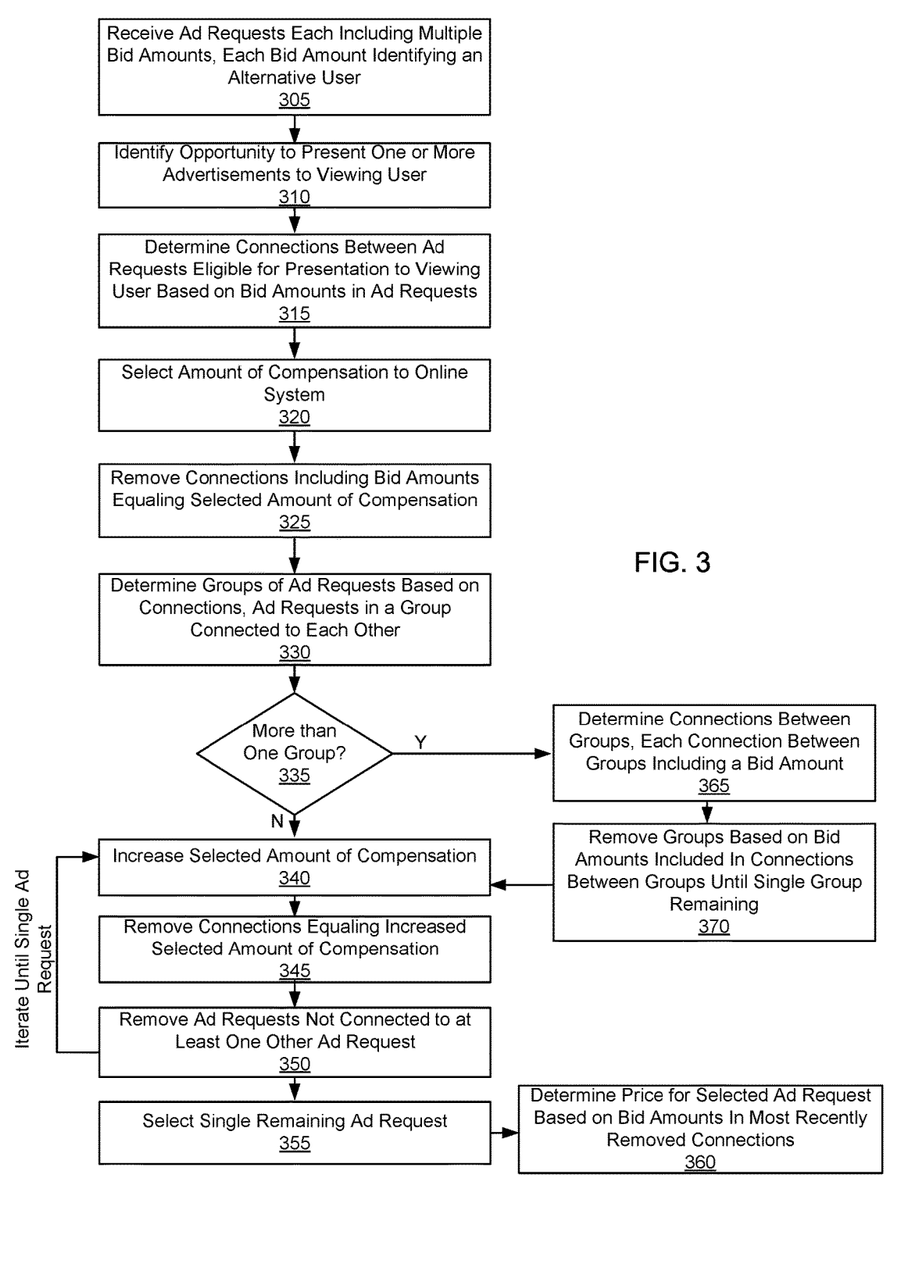
FIG. 3 is a flowchart of a method for selecting an advertisement request ("ad request") for presentation to a user and determining a price to charge a user providing the selected ad request, in accordance with an embodiment.

FIG. 3 is a is a flowchart of one embodiment of a method for selecting an advertisement request ("ad request") for presentation to a user and determining a price to charge a user providing the selected ad request. In various embodiments, the steps described in conjunction with FIG. 3 may be performed in different orders than the order described in conjunction with FIG. 3. Additionally, the method may include different and/or additional steps than those described in conjunction with FIG. 0.3 in some embodiments.

The online system 140 receives advertisement requests ("ad requests") from one or more users with each ad request including an advertisement for presentation to online system users. Additionally, each ad request includes one or more bid amounts. A bid amount included in an ad request identifies an amount of compensation to the online system 140 from a user providing the ad request in exchange for the online system 140 presenting an advertisement from the ad request to a user or in exchange for a user performing one or more interactions with the advertisement from the ad request if the advertisement is presented to the user. Each bid amount included in an ad request also identifies an alternative user, so a bid amount specifies a maximum amount of compensation a user associated with the ad request is willing to provide the online system 140 to select the ad request over another ad request provided to the online system 140 by the alternative user. Hence, an ad request may include different bid amounts each associated with different alternative users, allowing a user to specify different amounts of compensation to the online system 140 for selecting the ad request relative to other ad requests associated with different alternative users. Hence, the online system 140 maintains 305 multiple ad requests, with each ad request including multiple bid amounts that each identify an alternative user and specify an amount of compensation to the online system 140 from a user associated with the ad request.

When the online system 140 identifies 310 an opportunity to present an advertisement to a viewing user, the online system 140 identifies ad requests eligible for presentation to the viewing user and determines 315 connections between each of the identified ad requests based on the bid amounts included in the identified ad requests. A connection between an ad request and an additional ad request includes a bid amount included in the ad request that identifies a user associated with the additional ad request. Hence, a connection between the ad request and the additional ad request represents an amount of compensation a user associated with the ad request is willing to provide the online system 140 to select the ad request over the additional ad request. Similarly, a connection between the additional ad request and the ad request represents an amount of compensation an alternative user associated with the additional ad request is willing to provide the online system 140 to select the additional ad request over the ad request. By determining 315 connections between each of the selected ad requests, the online system 140 maintains a graph of the selected ad requests where the identified ad requests are connected to each other based on bid amounts in various identified ad requests that identify users associated with other identified ad requests.

Figure 4A:
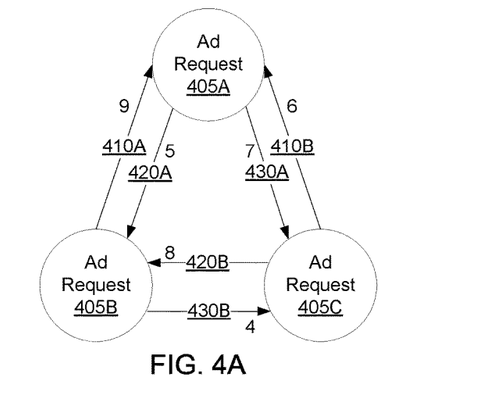
FIGS. 4A-4F are conceptual diagrams of connections between ad requests based on bid amounts in the ad requests and selection of an ad request based on the connections, in accordance with an embodiment.

FIG. 4A is a conceptual diagram of connections between various ad requests based on bid amounts included in the ad requests. For purposes of illustration, FIG. 4A shows three ad requests 405A, 405B, and 405C. However, any number of ad requests may be connected to each other in various embodiments. In the example of FIG. 4A, ad request 405A includes a bid amount of $9 that identifies a user associated with ad request 405B and includes a bid amount of $6 that identifies a user associated with ad request 405C. Similarly, ad request 405B includes a bid amount of $5 that identifies a user associated with ad request 405A and includes a bid amount of $8 that identifies the user associated with ad request 405C. Additionally, ad request 405C includes a bid amount of $7 that identifies the user associated with ad request 405A and includes a bid amount of $4 that identifies the user associated with ad request 405B.

Based on the bid amounts included in ad requests 405A, 405B, and 405C, the online system 140 determines connections between the ad requests 405A, 405B, and 405C. In the example of FIG. 4A, the online system 140 determines a connection 410A from ad request 405A to ad request 405B including the bid amount of $9 from ad request 405A identifying the user associated with ad request 405B and determines a connection 410B from ad request 405A to ad request 405C including the bid amount of $6 from ad request 405A identifying the user associated with ad request 405C. Similarly, the online system 140 determines a connection 420A from ad request 405B to ad request 405A including the bid amount of $5 from ad request 405B identifying the user associated with ad request 405A and determines a connection 420B from ad request 405B to ad request 405C including the bid amount of $8 from ad request 405B identifying the user associated with ad request 405C. The online system 140 also determines a connection 430A from ad request 405C to ad request 405A including the bid amount of $7 from ad request 405C identifying the user associated with ad request 405A and determines a connection 430B from ad request 405C to ad request 405B including the bid amount of $4 from ad request 405C identifying the user associated with ad request 405B. Hence, the connections between ad requests 405A, 405B, and 405C determined by the online system 140 generate a graph of bid amounts connected to each other based on bid amounts in the ad requests 405A, 405B, 405C identifying users associated with other ad request 405A, 405B, and 405C.

Figure 4B:
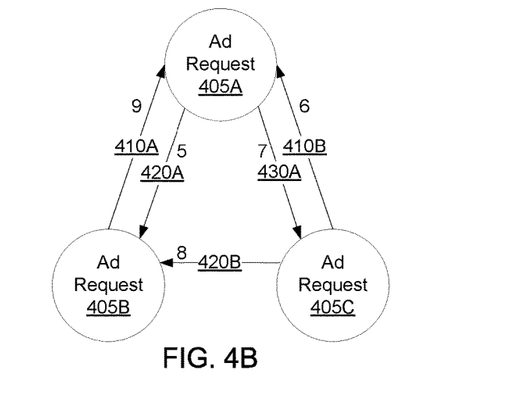

Referring back to FIG. 3, the online system 140 selects an ad request including an advertisement for presentation to the viewing user based on the connections between the identified ad requests. To select an ad request, the online system 140 selects 320 an amount of compensation and removes 325 connections between identified ad requests that include bid amounts equaling the selected amount of compensation, indicating that a bid amount included in a removed connection from an ad request to an additional ad request is sufficient for selection of the ad request over the additional ad request. Hence, the specified amount provides a minimum bid amount for the online system 140 to select the ad request over the additional ad request to which the ad request is connected. Referring to FIG. 4B, the online system 140 selects 320 $4 as the amount of compensation, so the connection 430B between ad request 405B and ad request 405C that includes the bid amount of $4 is removed 325 by the online system 140.

After removing 325 the connections between ad requests including bid amounts equaling the selected amount of compensation, the online system 140 determines 330 one or more groups of identified ad requests based on the connections between the identified ad requests. A group of identified ad requests includes multiple ad requests that are connected to each of the other ad requests in the group; hence, a group includes ad requests with bidirectional connections to each other ad request in the group. A connection between ad requests in the group may be a direct connection, where an ad request is connected to another ad request in the group, or may be an indirect connection, where an ad request is connected to an intermediate ad request that is connected to the other ad request in the group or that is connected to one or more intermediate ad requests in the group, with at least one of the intermediate ad requests connected to the other ad request in the group. Referring to the example of FIG. 4B, ad request 405A is directly connected to ad request 405B via connection 410A and is also directly connected to ad request 405C via connection 410B. Similarly, ad request 405B is directly connected to ad request 405A via connection 420A and is also directly connected to ad request 405C via connection 420B. In the example of FIG. 4B, ad request 405C is directly connected to ad request 405A via connection 430A, but is indirectly connected to ad request 405B via connection 430A to ad request 405A and connection 410A from ad request 405A to ad request 405B. Hence, FIG. 4B shows a single group of ad requests 405A, 405B, and 405C that are each connected to each other ad request 405A, 405B, and 405C in the group.

Referring back to FIG. 3, the online system 140 determines 335 if more than one group of ad requests were determined 330. In response to determining 335 a single group was determined 330 by the online system 140, the online system 140 increases 340 the selected amount of compensation and removes 345 connections between ad requests in the group including bid amounts equaling the increased selected amount of compensation. After removing 345 connections between ad requests in the group, the online system 140 removes 350 ad requests from the group that do not have a connection to at least one other ad request in the group. The online system 140 iteratively increases 340 the selected amount of compensation, removes 345 connections between ad requests in the group based on the increased selected amount of compensation, and removes 350 ad requests from the group until a single ad request remains in the group. The online system 140 selects 355 the single ad request remaining in the group for presentation to the viewing user.

Figure 4C:
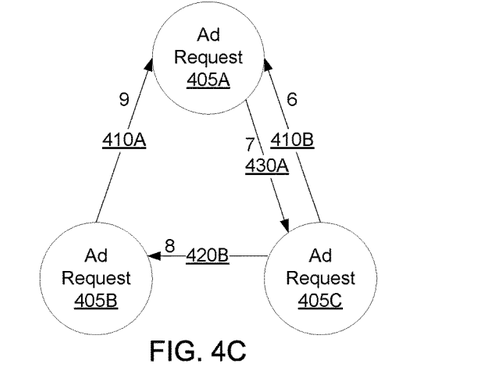
Figure 4D:
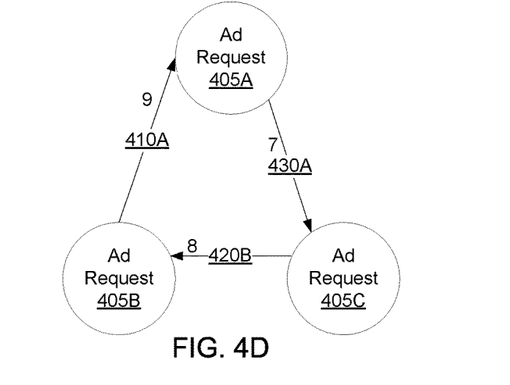
Figure 4E:
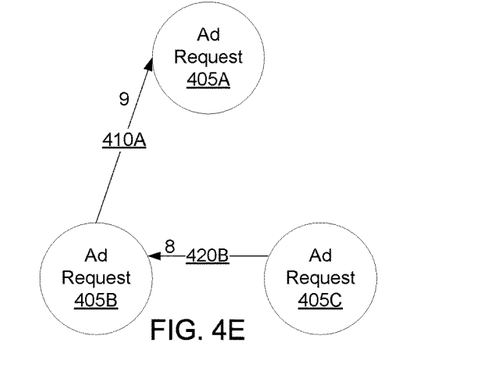
Figure 4F:
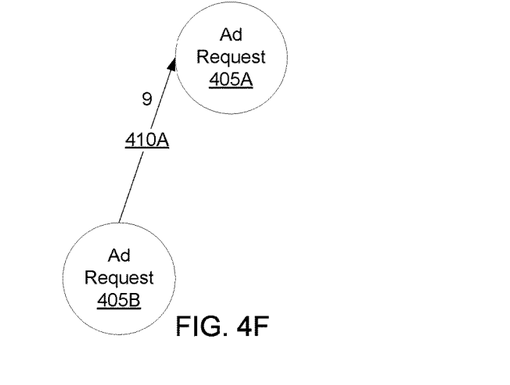

FIG. 4C-4F are conceptual diagrams showing iterative increase 340 of the selected amount of compensation, removal 345 of connections between ad requests in a group, and removal 350 of ad requests from the group. In FIG. 4C, the selected amount of compensation is increased 340 to $5, so connection 420A, which includes a bid amount of $5, is removed 345. Subsequently, the selected amount of compensation is increased 340 to $6 in FIG. 4D, causing removal of connection 410B between ad request 405A and ad request 405C. Similarly, FIG. 4E shows increasing 340 of the selected amount of compensation to $7, causing the online system 140 to remove 340 connection 430A between ad request 405C and ad request 405A, which includes a bid amount of $7. When the online system 140 increases 340 the selected amount of compensation to $8, the online system 140 removes 345 connection 420B between ad request 405C and ad request 405B, which includes a bid amount of $8. Removing 345 connection 420B causes ad request 405C to lack at least one connection to another ad request 405A, 405B in the group; hence, as shown in FIG. 4F, the online system 140 removes 350 ad request 405C, so the group includes ad request 405A and ad request 405B. When the online system 140 again increases 340 the selected amount of compensation to $9, the online system 140 similarly removes 345 connection 410A between ad request 405A and ad request 405B, which includes a bid amount of $9, removing the connection between ad request 405B and ad request 405A and causing removal 350 of ad request 405B. Hence, the online system 140 selects 355 ad request 405A from the group for presentation to the viewing user.

Additionally, the online system 140 determines 360 a price to charge a user associated with the selected ad request based on bid amounts included in connections removed 345 so the single ad request remains in the group. For example, the online system 140 determines 360 the price charged to the user associated with the selected ad request as a bid amount included in a connection between the selected ad request and another ad request in the group that was most recently removed 345. For example, referring to the example of FIGS. 4C-4F, the online system 140 determines 360 the price charged to the user associated with ad requests 405A as $9, which was the bid amount included in the most recently removed 350 connection including an amount specified by the user associated with ad request 405A and identifying a user associated with another ad request. In other embodiments, the online system 140 determines 360 the price charged to the user associated with the selected ad request as a function of bid amounts included in connections between the selected ad request and other ad requests in the group including amounts specified by a user associated with the selected ad request that were most recently removed 345. In one embodiment, the online system 140 determines 360 the price charged to the user associated with the selected ad request as a mean or a median of the bid amounts included in the selected ad request and included in connections between the selected ad request and the other ad requests in the group that were most recently removed 340 prior to selecting 360 the selected ad request. In other embodiments, the online system 140 determines 360 the price charged to the user associated with the selected ad request as a maximum bid amount included in the selected ad request and included in connections between the selected ad request and the other ad requests in the group that were most recently removed 340 prior to selecting 355 the selected ad request. Alternatively, the online system 140 determines 360 the price charged to the user associated with the selected ad request as a minimum bid amount included in the selected ad request and included in connections between the selected ad request and the other ad requests in the group that were most recently removed 340 prior to selecting 355 the selected ad request. In other embodiments, the online system 140 determines 360 the price charged to the user associated with the selected ad request by randomly selecting a bid amount included in the selected ad request and included in one of the connections between the selected ad request and the other ad requests in the group that was most recently removed 340 prior to selecting 355 the selected ad request.

In response to determining 335 multiple groups were determined 330 by the online system 140, the online system 140 removes one or more groups in which each ad request in the group includes bid amounts identifying users associated with other ad requests in the group and does not include bid amounts identifying users associated with ad requests outside of the group. Users associated with ad requests in a group where no ad request includes a bid amount identifying a user associated with an ad request outside of the group are users only bidding against users associated with other ad requests in the group. Hence, users in a group that does not include an ad request having a bid amount identifying a user outside of the group may have an incentive to collude with each other to determine a maximum bid amount shared by multiple users associated with ad requests in the group. Additionally, a user associated with an ad request in a group that does not include an ad request having a bid amount identifying another user outside of the group may provide the online system 140 with greater amounts of compensation than desired to prevent selection of other ad requests in the group associated with different users when selection of an ad request associated with a user outside of the group would benefit the user by preventing selection of other ad requests in the group associated with different users. Providing the online system 140 with such a larger than expected amount of compensation may subsequently deter the user from providing additional ad requests to the online system 140 to be subsequently presented.

Figure 5A:
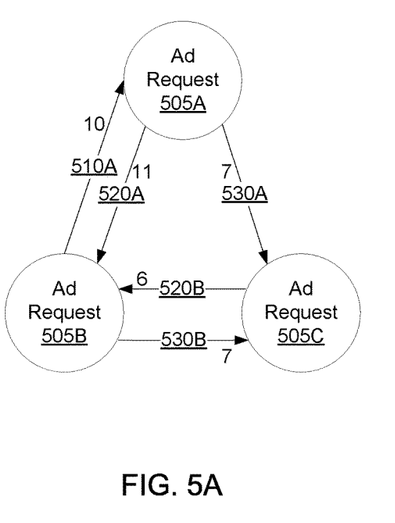
FIGS. 5A and 5B are conceptual diagrams of connections between ad requests identifying a group including ad requests that do not have bid amounts identifying users associated with one or more ad requests outside of the group, in accordance with an embodiment.

FIGS. 5A and 5B are conceptual diagrams illustrating an example of removing a group including ad requests having bid amounts that do not identify at least one user associated with an ad request outside of the group. In the example of FIG. 5A, ad request 505A includes a bid amount of $10 that identifies a user associated with ad request 505B, resulting in connection 510A between ad request 505A and ad request 505B. Ad request 505B includes a bid amount of $11 that identifies a user associated with ad request 505A, resulting in connection 520A between ad request 505B and ad request 505A Additionally, ad request 505B includes another bid amount of $6 that identifies a user associated with ad request 505C, resulting in connection 520B between ad request 505B and ad request 505C. Similarly, ad request 505C includes a bid amount of $7 that identifies the user associated with ad request 505A, resulting in connection 530A between ad request 505C and ad request 505A; ad request 505C also includes a bid amount of $7 that identifies the user associated with ad request 505B, resulting in connection 530B between ad request 505C and ad request 505B, as described above. Hence, the online system 140 subsequently selects 355 the single remaining ad request, ad request 505C, for presentation to the viewing user, and determines 360 a price to charge the user associated with ad request 505C, as further described above.

Figure 5B:
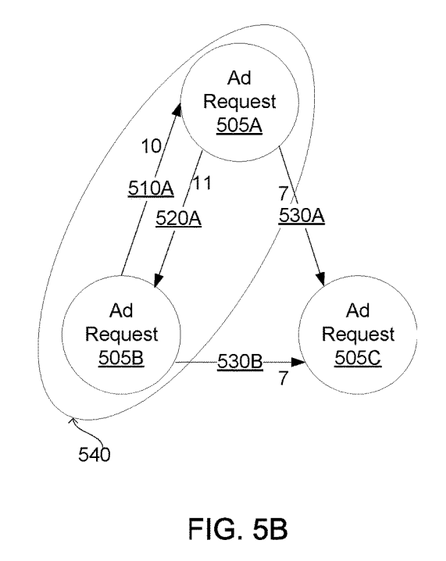

When the online system 140 selects 320 an amount of compensation of $6, the online system 140 removes 325 connection 520B, which includes the bid amount of $6. After removing 325 connection 520B, neither ad request 505A nor ad request 505B include a bid amount identifying the user associated with ad request 505C. However, ad request 505A includes a bid amount identifying the user associated with ad request 505B, and ad request 505B includes a bid amount identifying the user associated with ad request 505A. Accordingly, the online system 140 determines 330 ad request 505A and ad request 505B are included in a group 540 because ad request 505A an ad request 505B are each connected to each other. Group 540 does not include ad request 505C because neither ad request 505A nor ad request 505B includes a bid amount identifying the user associated with ad request 505C. Accordingly, the online system 140 removes group 540 from evaluation.

Additionally, the online system 140 determines 365 connections between various remaining groups and bid amounts included in the determined connections between groups. A connection between a group and an additional group includes a bid amount based on bid amounts associated with ad requests in the group that identify users associated with ad requests included in the additional group. In various embodiments, the online system 140 determines 365 a bid amount included in a connection between a group and an additional group as a maximum bid amount included in an ad request in the group that identifies a user included in the additional group. Alternatively, the online system 140 determines 365 the bid amount the connection between a group and an additional group as a minimum bid amount included in an ad request in the group that identifies a user included in the additional group. In another embodiment, the online system 140 determines 365 the connection between a group and an additional group as a mean of bid amounts included in ad requests in the group that identify a user included in the additional group. Hence, a bid amount included in a connection between a group and an additional group specifies an amount of compensation a user associated with an ad request in the group will provide the online system so the ad request in the group is selected by the online system 140 in place of an ad request included in the additional group.

Based on the connections between various groups, the online system 140 removes 370 groups until a single group of ad request remains. In various embodiments, the online system 140 removes 370 connections between groups based on the bid amounts included in the connections between groups and removes 375 groups that are no longer connected to other groups until a single group of ad requests remains. For example, the online system 140 removes 370 a connection between groups having a minimum bid amount then continues removing 370 a connection between groups having a minimum bid amount from the remaining groups and removing 375 groups without a connection to at least one other group after removing 370 the connection until a single group remains. When a single group remains, the online system 140 selects 355 an ad request from the ad requests included in the single group based on the bid amounts of the ad requests included in the single group and determines 360 a price to charge the user associated with the selected ad request, as further described above.

While FIGS. 3-5B describe selection of an ad request for presentation to a viewing user, the method described in conjunction with FIGS. 3-5B may be used by the online system 140 to select from multiple users providing bid amounts for any suitable product or service. For example, the online system 140 receives multiple bid amounts for a product or a service from a user, with each bid amount received from the user identifying an amount of compensation from the user to the online system and identifying an additional user; hence, a bid amount provided by the user to the online system 140 specifies an amount of compensation the user is willing to provide the online system 140 to select the user over the additional user. The online system 140 then identifies connections between users based on the bid amounts, determines groups of users based on the connections, and removes groups or users until a single user remains, as further described above in conjunction with FIGS. 3-5B. After selecting the single user, the online system 140 determines a price to charge the selected user based on bid amounts provided by the selected user that were included in connections from the selected user to other users that were most recently removed before selection of the user, as further described above in conjunction with FIG. 3.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining a plurality of advertisement requests ("ad requests") at an online system, each ad request associated with a user and including a plurality of bid amounts, where each bid amount identifies an alternative user and specifies an amount of compensation from the user associated with the ad request to the online system;
   for each of the plurality of ad requests, determining connections between the ad requests and additional ad requests associated with alternative users, a connection between the ad request and an additional ad request associated with the alternative user including a bid amount included in the ad request identifying the alternative user;
   selecting an amount of compensation to the online system;
   removing connections between ad requests having bid amounts less than the selected amount of compensation;
   determining one or more groups of ad requests based on the connections, each ad request in a group having one or more connections to each other ad request in the group;
   in response to determining a single group of ad requests:
      increasing the selected amount of compensation, removing connections between ad requests in the single group including bid amounts equaling the increased selected amount of compensation, and removing ad requests without a connection to at least one other ad request in the group until the single group includes a single ad request;
      selecting the single ad request; and
      determining a price to charge a user associated with the selected single ad request based on bid amounts included in connections from the selected single ad request to one or more other ad requests in the group most recently removed before selecting the single ad request; and
   in response to identifying more than a single group of ad requests:
      removing a group in which at least one ad request does not have a connection to another ad request that is not included in the group;
      determining connections between the groups, a connection between a group and an additional group including a bid amount based on bid amounts of ad requests in the group identifying users associated with ad requests in the additional group; and
      removing connections between groups based on the bid amounts included in the connections between groups and removing groups that are no longer connected to at least one other group after removing the connections between groups until the single group remains.

2. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a bid amount included in a most recently removed connection from the single ad request to another ad request in the group.

3. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a median of the bid amounts included in the selected single ad request and included in the most recently removed connections from the selected single ad request to one or more other ad requests before selecting the single ad request.

4. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a mean of the bid amounts included in the selected single ad request and included in the most recently removed connections from the selected single ad request to one or more other ad requests before selecting the single ad request.

5. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a maximum of the bid amounts included in selected single ad request and included in the most recently removed connections from the selected single ad request to one or more other ad requests before selecting the single ad request.

6. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a minimum of the bid amounts included in the selected single ad request and included in the most recently removed connections from the selected single ad request to one or more other ad requests before selecting the single ad request.

7. The method of claim 1, wherein determining the price to charge the user associated with the selected single ad request based on bid amounts included in connections from the selected single ad request to one or more other ad requests in the group most recently removed before selecting the single ad request comprises:
   determining the price to charge the user associated with the selected single ad request as a bid amount randomly selected from the bid amounts included in selected single ad request and included in the most recently removed connections from the selected single ad request to one or more other ad requests before selecting the single ad request.

8. The method of claim 1, wherein removing connections between groups based on the bid amounts included in the connections between groups and removing groups that are no longer connected to at least one other group after removing the connections between groups until the single group remains comprises:
   removing a connection between the group and the additional group including a minimum bid amount; and
   removing the additional group in response to the additional group no longer being connected to at least one group.

9. The method of claim 1, wherein the connection between the group and the additional group includes a bid amount comprising a maximum bid amount included in an ad request in the group that identifies a user associated with an ad request included in the additional group.

10. The method of claim 1, wherein the connection between the group and the additional group includes a bid amount comprising a mean of bid amounts included in ad requests in the group that identify a user associated with an ad request included in the additional group.

11. A computer program product comprising a non-transitory computer-readable storage medium having instructions encoded thereon that, when executed by a processor, cause the processor to:
   maintain a plurality of advertisement requests ("ad requests") at an online system, each ad request associated with a user and including a plurality of bid amounts, where each bid amount identifying an alternative user and specifying an amount of compensation from the user associated with the ad request to the online system;
   for each of the plurality of ad requests, determine connections between the ad requests and additional ad requests associated with alternative users, a connection between the ad request and an additional ad request associated with the alternative user including a bid amount included in the ad request identifying the alternative user;
   select an amount of compensation to the online system;
   remove connections between ad requests having bid amounts less than the selected amount of compensation;
   determine one or more groups of ad requests based on the connections, each ad request in a group having one or more connections to each other ad request in the group;
   in response to determining a single group of ad requests:
      increase the selected amount of compensation, removing connections between ad requests in the single group including bid amounts equaling the increased selected amount of compensation, and removing ad requests without a connection to at least one other ad request in the group until the single group includes a single ad request;
      select the single ad request; and
      determine a price to charge a user associated with the selected single ad request based on bid amounts included in connections from the selected single ad request to one or more other ad requests in the group most recently removed before selecting the single ad request; and
   in response to identifying more than a single group of ad requests:
      remove a group in which at least one ad request does not have a connection to another ad request that is not included in the group;

determine connections between the groups, a connection between a group and an additional group including a bid amount based on bid amounts of ad requests in the group identifying users associated with ad requests in the additional group; and remove connections between groups based on the bid amounts included in the connections between groups and removing groups that are no longer connected to at least one other group after removing the connections between groups until the single group remains.

12. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a bid amount included in a most recently removed connection from the single ad request to another ad request in the group.

13. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a median of the bid amounts included in the selected single ad request and included in the most recently removed connections from the selected single ad request to one or more other ad requests before selecting the single ad request.

14. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a mean of the bid amounts included in the selected single ad request and included in the most recently removed connections from the selected single ad request to one or more other ad requests before selecting the single ad request.

15. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a maximum of the bid amounts included in selected single ad request and included in the most recently removed connections from the selected single ad request to one or more other ad requests before selecting the single ad request.

16. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a minimum of the bid amounts included in the selected single ad request and included in the most recently removed connections from the selected single ad request to one or more other ad requests before selecting the single ad request.

17. The computer program product of claim 11, wherein determine the price to charge the user associated with the selected single ad request based on bid amounts included in connections from the selected single ad request to one or more other ad requests in the group most recently removed before selecting the single ad request comprises:

determine the price to charge the user associated with the selected single ad request as a bid amount randomly selected from the bid amounts included in selected single ad request and included in the most recently removed connections from the selected single ad request to one or more other ad requests before selecting the single ad request.

18. The computer program product of claim 11, wherein remove connections between groups based on the bid amounts included in the connections between groups and removing groups that are no longer connected to at least one other group after removing the connections between groups until the single group remains comprises:

remove a connection between the group and the additional group including a minimum bid amount; and remove the additional group in response to the additional group no longer being connected to at least one group.

\* \* \* \* \*